US011332646B2

(12) United States Patent
Becker et al.

(10) Patent No.: US 11,332,646 B2
(45) Date of Patent: May 17, 2022

(54) HOT MELT ADHESIVE COMPRISING ISOTHIAZOLINONE FUNGICIDES

(71) Applicant: HENKEL AG & CO. KGAA, Duesseldorf (DE)

(72) Inventors: Bettina Becker, Mettmann (DE); Andrea Hoffmann, Duesseldorf (DE); Andre Kluth, Hilden (DE)

(73) Assignee: Henkel AG & Co. KGaA, Dusseldorf (DE)

( * ) Notice: Subject to any disclaimer, the term of this patent is extended or adjusted under 35 U.S.C. 154(b) by 20 days.

(21) Appl. No.: 16/439,930

(22) Filed: Jun. 13, 2019

(65) Prior Publication Data

US 2019/0309194 A1 Oct. 10, 2019

Related U.S. Application Data

(63) Continuation of application No. PCT/EP2017/081374, filed on Dec. 4, 2017.

(30) Foreign Application Priority Data

Dec. 19, 2016 (EP) .................... 16205106

(51) Int. Cl.
| | |
|---|---|
| *C09J 11/06* | (2006.01) |
| *A01N 43/78* | (2006.01) |
| *B01D 46/00* | (2006.01) |
| *C09J 123/08* | (2006.01) |
| *C08K 5/00* | (2006.01) |
| *C08K 5/46* | (2006.01) |
| *C08K 5/45* | (2006.01) |

(52) U.S. Cl.
CPC .............. *C09J 11/06* (2013.01); *A01N 43/78* (2013.01); *B01D 46/0001* (2013.01); *B01D 46/0028* (2013.01); *C08K 5/0058* (2013.01); *C08K 5/46* (2013.01); *C09J 123/0853* (2013.01); *C08K 5/45* (2013.01); *C09J 2301/304* (2020.08)

(58) Field of Classification Search
CPC .............. C09J 123/0853; C09J 123/08; B01D 46/0028; C08K 5/45; C08K 5/46; C08K 5/0058; C08K 5/47; A01N 43/08
See application file for complete search history.

(56) References Cited

U.S. PATENT DOCUMENTS

| | | | | |
|---|---|---|---|---|
| 5,827,913 | A | * | 10/1998 | Baetzold ................. C09J 9/005 523/210 |
| 6,288,149 | B1 | | 9/2001 | Kroll |
| 6,531,544 | B1 | | 3/2003 | Vaughan et al. |
| 2004/0020589 | A1 | | 2/2004 | Good et al. |
| 2006/0117728 | A1 | * | 6/2006 | Dolan ................... B01D 39/18 55/502 |
| 2014/0066872 | A1 | | 3/2014 | Baer et al. |
| 2017/0112126 | A1 | * | 4/2017 | Rettori .................. A01N 25/24 |
| 2019/0309194 | A1 | | 10/2019 | Becker et al. |

FOREIGN PATENT DOCUMENTS

| | | | | |
|---|---|---|---|---|
| CN | 1688668 | A | | 10/2005 |
| CN | 102108269 | A | | 6/2011 |
| CN | 104087208 | A | * | 10/2014 |
| CN | 104087208 | A | | 10/2014 |
| CN | 105400454 | A | * | 3/2016 |
| CN | 105733473 | A | * | 7/2016 |
| CN | 107057620 | A | | 8/2017 |
| JP | 2004223422 | A | * | 8/2004 |
| KR | 20160112800 | A | * | 9/2016 |
| KR | 20170048059 | A | * | 5/2017 |
| WO | WO-9601562 | A1 | * | 1/1996 ........... C08K 5/0058 |
| WO | WO-0141564 | A2 | * | 6/2001 ............. A01N 53/00 |
| WO | WO-2008046746 | A2 | * | 4/2008 ............. A01N 43/78 |
| WO | WO-2012076529 | A1 | * | 6/2012 ............. A01N 43/80 |
| WO | 2016139221 | A1 | | 9/2016 |
| WO | 2016196116 | A1 | | 12/2016 |

OTHER PUBLICATIONS

FIT translation of CN 105400454 (2016, 3 pages).*
FIT translation of CN 105733473 (2016, 5 pages).*
Google patents translation of CN 104087208 (2016, 6 pages).*
Google patents translation of KR 20170048059 (2017, 7 pages).*
Google patents translation of JP 2004223422 (2004, 6 pages).*
Google patents translation of KR 20160112800 (2016, 6 pages).*
Adhesives.org (Hot Melt, Adhesives.org, 2021, 1 page).*
Glue Machinery Corporation (Softening point/Hot Melt Adhesives, Glue Machinery Corporation, 2021, 3 pages).*
Google Patents translation of WO 2012/076529 (2012, 10 pages).*
Li Zi Dong Deng, "Adhesive Agent," 2nd Edition, Chemical Industry Press, Beijing, China, Jun. 2009, Chapter 24, pp. 603-604, ISBN:978-7-12-205220-9.

* cited by examiner

*Primary Examiner* — Brieann R Johnston
(74) *Attorney, Agent, or Firm* — Sun Hee Lehmann; Steven C. Bauman

(57) ABSTRACT

The present invention relates to hot melt adhesive compositions comprising ethylene vinyl acetate copolymer(s) and isothiazolinone fungicides according to formula (I). Such hot melt adhesives show improved fungus resistance and are thus particularly suited for applications where such properties are desirable, such as ventilation and air-conditioning systems and air filters. The invention further relates to the use of said hot melt adhesives in such ventilation and air-conditioning systems and air filters as well as for bonding, stabilizing and sealing of pleats, edge and frame bonding, or seam sealing of bag filters. Further encompassed are air filters comprising the hot melt adhesives and methods of their manufacture using the hot melt adhesives of the invention.

7 Claims, No Drawings

HOT MELT ADHESIVE COMPRISING ISOTHIAZOLINONE FUNGICIDES

FIELD OF THE INVENTION

The present invention relates to hot melt adhesive compositions comprising ethylene vinyl acetate copolymer(s) and isothiazolinone fungicides. Such hot melt adhesives show improved fungus resistance and are thus particularly suited for applications where such properties are desirable, such as ventilation and air-conditioning systems and air filters. The invention further relates to the use of said hot melt adhesives in such ventilation and air-conditioning systems and air filters as well as for bonding, stabilizing and sealing of pleats, edge and frame bonding, or seam sealing of bag filters. In still another aspect, the invention also relates to the air filters comprising the hot melt adhesives and methods of their manufacture using the hot melt adhesives of the invention.

BACKGROUND OF THE INVENTION

Hot melt adhesives are applied to a substrate while in a molten state and cooled to harden the adhesive layer. The hot melt adhesives are commonly used to seal packages such as cardboard cases, trays and cartons and are used for the manufacture of a multitude of disposable articles, such as disposable diapers, sanitary napkins, surgical drapes, hospital pads, and adult incontinent products, etc. Disposable articles are typically composed of several components that are bonded together by various hot melt adhesives.

Ethylene vinyl acetate (EVA) copolymer based hot melt adhesives are widely used for a variety of purposes, including the in case and carton sealing as well as the bonding of plastic or polyolefin films, e.g., polyethylene films, to tissue or nonwoven substrates in construction of disposable articles. One common use is their use in air filters, such as those used in ventilation and air-conditioning systems, for example for clean rooms. Such hot melt adhesives need to fulfill the VDI 60 22 (ISO 846) classification 1 minimum, i.e. have to provide for sufficient fungal and bacterial resistance. For this purpose, it is known to include suitable stabilizers, such as fungicides and biocides, into the hot melts. Such stabilizers need to exhibit sufficient thermal stability, homogeneous incorporation into the hot melt matrix and no significant negative impact on color and color stability of the adhesive.

Known stabilizers, such as thiabendazole, tend to migrate to the surface of the hot melt over time. This can be undesirable so that there is need in the art for alternative stabilizers that do not show such migration while still having sufficient fungicidal activity and thermal stability. Advantageously, they should also allow homogeneous incorporation into the hot melt matrix and show no significant negative impact on color and color stability of the adhesive.

BRIEF SUMMARY OF THE INVENTION

It has now surprisingly been found that this need is met by hot melt adhesives based on EVA copolymers that additionally comprise an isothiazolinone fungicide. The present invention is therefore, in a first aspect, directed to a hot melt adhesive comprising i) at least one ethylene-vinyl acetate copolymer; and
ii) at least one fungicide selected from compounds having the formula (I)

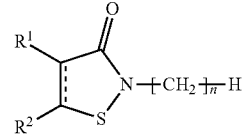

wherein
$R^1$ and $R^2$ are independently selected from H, F, Cl, Br, I, —$CH_3$, —$C_2H_5$, a $C_3$ to $C_{50}$ alkyl group which can be substituted or unsubstituted, linear, branched or cyclic; preferably $R^1$ and/or $R^2$ is selected from H, F, Cl, Br, —$CH_3$, and —$C_2H_5$, more preferably $R^1$ and/or $R^2$ is selected from H, Cl, and —$CH_3$, most preferably $R^1$ and/or $R^2$ is H or Cl; or $R^1$ and $R^2$ together with the carbon atoms they are attached to form a substituted or unsubstituted aromatic 6-membered ring or a substituted or unsubstituted aliphatic 5- or 6-membered ring, preferably $R^1$ and $R^2$ together with the carbon atoms they are attached to form a substituted or unsubstituted benzene ring, more preferably $R^1$ and $R^2$ together with the carbon atoms they are attached to form an unsubstituted benzene ring; and n is an integer from 0 to 20, preferably n is an integer from 0 to 10, more preferably n is 0 or n is 1 to 10.

In a further aspect, the invention relates to the use of the hot melt adhesive according to the invention as adhesive in applications that have to be compliant with the VDI 6022 standard, preferably ventilation and air conditioning systems, more preferably the air filters of such systems.

Another aspect relates to an air filter comprising the hot melt adhesive according to the invention and a filter element.

A still further aspect of the invention is directed to a method of manufacturing an air filter, comprising the steps a) melting the hot melt adhesive according to the invention; and b) applying the molten hot melt adhesive of step a) to an air filter media via nozzle, slot die, foaming, spray- or roller application.

Finally, the invention is also directed to the use of the hot melt adhesive according to the invention for bonding, stabilizing and sealing of pleats; edge and frame bonding; or seam sealing of bag filters.

DETAILED DESCRIPTION OF THE INVENTION

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polymer" means that at least one type of molecule falling within the definition for a polymer is used but that also two or more different molecule types falling within this definition can be present, but does not mean that only one molecule of said polymer is present.

If reference is made herein to a molecular weight of a polymer, this reference refers to the average number molecular weight $M_n$, if not explicitly stated otherwise. The number average molecular weight $M_n$ of a polymer can, for example, be determined by gel permeation chromatography according to DIN 55672-1:2007-08 with polystyrene standards and THF as the eluent. If not stated otherwise, all given molecular weights are those determined by GPC. The weight average molecular weight $M_w$ can also be determined by GPC, as described for $M_n$.

All percentages given herein in relation to the compositions or formulations relate to weight % relative to the total weight of the respective composition or formula, if not explicitly stated otherwise.

"About" or "approximately" as used herein in connection with a numerical value refers to the numerical value ±10%, preferably ±5%.

If reference is made herein to DIN ISO 846 or ISO 846, this refers to DIN ISO 846:1997, unless otherwise indicated.

The present invention is based on the inventor's surprising finding that incorporation of an isothiazolinone fungicide of formula (I) into an EVA hot melt adhesive provides for compositions that show good fungus resistance and thus comply with the relevant standard (VDI 6022/ISO 846) and on the other hand show thermal stability, good homogenization of the fungicide in the matrix with minimized migration and good color stability.

The compositions of the invention include at least one ethylene vinyl acetate copolymer. The utilized ethylene vinyl acetate copolymers may have different vinyl acetate contents and melt indices. "Average vinyl acetate content", as used herein, refers to the vinyl acetate content of the ethylene vinyl acetate copolymer(s) used in the adhesive composition, based on the total weight of the ethylene vinyl acetate copolymer(s) in the adhesive composition. If more than one ethylene vinyl acetate copolymer(s) are used in the adhesive composition, and each copolymer has different vinyl acetate content the average vinyl acetate content is the average of vinyl acetate content of the blend of ethylene vinyl acetate copolymers based on the total weight of the blend of ethylene vinyl acetate copolymers used in the adhesive composition.

The ethylene vinyl acetate copolymer in the adhesive composition preferably has an average vinyl content of from about 10% to about 30% based on the weight of the copolymer(s). In one embodiment, the at least one ethylene vinyl acetate copolymer(s) has an average vinyl acetate content of from about 10% to about 25%. In some embodiments, the at least one ethylene vinyl acetate copolymer has an average vinyl acetate content of from about 10% to about 20%.

In various embodiments, useful ethylene vinyl acetate copolymers may have a melt index of no greater than about 500 g/10 min, or no greater than about 400 g/10 min. In other embodiments, ethylene vinyl acetate copolymer(s) may have a melt index of no greater than about 200 g/10 min. In some embodiments, ethylene vinyl acetate copolymer(s) may have a melt index of no less than about 40 g/10 min. In some other embodiments, ethylene vinyl acetate copolymer(s) may have a melt index of no less than about 60 g/10 min. In some embodiments, ethylene vinyl acetate copolymer(s) may have a melt index of no less than about 80 g/10 min. Examples of commercially available ethylene vinyl acetate copolymers include such as Elvax® 350 from Dupont (Wilmington, Del.), Escorene® 7520 from Exxon, (Huston, Tex.), Evatane® grades from Arkema (Colombes, France), Alcudia® grades from Repsol Quimica (Madrid, Spain) and Ateva®1850A from AT Plastics (Edmonton, Alberta, Canada).

The adhesive composition preferably includes at least about 5 wt.-%, or at least about 10 wt.-%, and up to about 90 wt.-%, up to about 80 wt.-%, up to about 70 wt.-%, up to about 60 wt.-% by weight ethylene vinyl acetate copolymer (s) based on the total weight of the adhesive composition. Preferably, the amounts range from 10 to 80 wt.-%, preferably 20 to 70 wt.-%, more preferably 30 to 60 wt.-%.

In various embodiments of the fungicide of formula (I), n is 1 to 8, for example 1, 2, 3, 4, 5, 6, 7 or 8. In other embodiments, n is 0.

$R^1$ and $R^2$ can both be hydrogen, halogen, or $C_{1-10}$ alkyl. Preferably, one or both of $R^1$ and $R^2$ are chlorine and, in more preferred embodiments, the other, if applicable, is hydrogen. In other preferred embodiments, $R^1$ and $R^2$ combine to form together with the carbon atoms to which they are attached a 6-membered aromatic or aliphatic ring, preferably aromatic ring that may be substituted or unsubstituted, but is preferably unsubstituted.

"Substituted", as used herein and if not defined otherwise, preferably refers to the replacement of a hydrogen atoms with a group selected from F, Cl, Br, I, $C_{1-20}$ alkyl group which can be linear or branched and optionally substituted with halogen, —OH, —$NH_2$, —NH(alkyl), —N(alkyl)$_2$, and —O(alkyl).

In preferred embodiments, the at least one fungicide ii) according to formula (I) is selected from methylisothiazolinone, methylchloroisothiazolinone, benzisothiazolinone, octylisothiazolinone, dichlorooctylisothiazolinone and n-butyl-benzisothiazolinone.

"------" in formula (I) relates to a single or double bond, but is preferably a double bond.

The fungicide of formula (I) is preferably contained in the adhesives in amounts of from 0.001 to 1.0 wt-%, preferably 0.01 to 0.5 wt.-%, more preferably 0.02 to 0.05 wt.-%, relative to the total weight of the adhesive composition.

In various embodiments, the adhesive composition further comprises a tackifiers, preferably a tackifying resin, more preferably a hydrocarbon resin. Useful tackifying resins generally include, e.g., rosin esters, abietic acid, abietic acid esters, terpene resins, terpene phenolic resins, poly-alpha-methylstyrene, phenol-modified styrene polymers, phenol-modified alpha-methylstyrene polymers, resorcinol resins, any compatible hydrocarbon resins, in particular aliphatic, aromatic or aromatic-aliphatic hydrocarbon resins or cumarone-indene resins and the like. More particularly, and depending upon the particular base polymer, the useful tackifying resins include (1) natural and modified rosins; (2) glycerol and pentaerythritol esters of natural and modified rosins; (3) copolymers and terpolymers of natural terpenes; (4) polyterpene resins having a softening point, as determined by ASTM method E28-58T, of 80° C. to 150° C.; (5) phenolic modified terpene resins and hydrogenated derivatives thereof; (6) aliphatic petroleum hydrocarbon resins having a Ball and Ring softening point of 70° C. to 135° C.; (7) aromatic petroleum hydrocarbon resins and the hydrogenated derivatives thereof; (8) alicyclic petroleum hydrocarbon resins and the hydrogenated derivatives thereof; (9) aromatic/aliphatic or alicyclic hydrocarbon resins, such as those sold under the trademarks ECR 149B and ECR 179A by Exxon Chemical Company; and combinations thereof. Tackifying resins disclosed in U.S. Pat. No. 6,288,149, which is incorporated by reference in its entirety, may also be useful.

Examples of useful commercially available tackifying resins include Escorez 2596 C5 aliphatic resins and Escorez 5600 aromatic dicyclopentadiene resins, and Escorez 5400, which are available from Exxon Chemical (Houston, Tex.), Zonatac 105LT styrenated terpene tackifying resins available from Arizona Chemical (Jacksonville, Fla.), and Eastotac H-130R aliphatic tackifying resins available from Eastman Chemical (Kingsport, Tenn.).

The adhesive composition of the invention may include from about from 0 to 70 wt.-%, preferably 20 to 50 wt.-%, more preferably 25 to 40 wt-% tackifier based on the total weight of the adhesive composition.

In some embodiments, the above-mentioned adhesive compositions further include at least one wax. If present, the wax is preferably contained in amounts from 0.5 to 50 wt-%, preferably 5 to 30 wt.-%, more preferably 10 to 25 wt.-%, relative to the total weight of the composition.

Waxes can, for example, be used in combination with the above defined tackifiers to further increase the tackiness of the adhesive. Preferably, the waxes are selected from Fischer Tropsch waxes and paraffin/hydrocarbon waxes. Exemplary waxes that can be used include, without limitation, polar waxes selected from functionalized polyolefins with a molecular weight range as determined by GPC between about 4000 and 80000 and based on ethylene and/or propylene with acrylic acid, methacrylic acid, C1-4 alkyl esters of (meth)acrylic acid, itaconic acid, fumaric acid, vinyl acetate, carbon monoxide, and in particular maleic acid and mixtures thereof. Preferred are ethylene, propylene or ethylene-propylene (co)polymers grafted or copolymerized with polar monomers with saponification and acid values, respectively, between 2 and 50 mg KOH/g.

The adhesive composition of the invention may optionally include from 0 to about 35 wt.-%, preferably from about 15 wt.-% to about 35 wt.-% of a plasticizer based on the total weight of the adhesive composition. In some embodiments, the above-mentioned adhesive compositions further include at least one plasticizer. Useful plasticizers are preferable those that are liquid at ambient temperature, also known as liquid plasticizers, such as plasticizing oils. In the context of the present invention a liquid plasticizer is also defined as a flow able diluent having a weight average molecular weight (Mw) of less than 3,000, preferably less than 2,000, and more preferably less than 1000. Suitable plasticizing oils are primarily hydrocarbon oils low in aromatic content. Preferably, the oils are paraffinic or naphthenic in character. The oils are preferably clear, low in volatility and have as little color and odor as possible. The use of plasticizing oils in the present invention also contemplates the use of olefin oligomers, low molecular weight polymers, vegetable oils and their derivatives and similar plasticizing liquids. Examples of commercially available plasticizers include Kaydol 35 from Witco Corporation (Greenwich Conn.), Calsol 5 series from Calumet Lubricants Company (Indianapolis, Ind.).

Other useful plasticizers include crystallizing plasticizers including, e.g., Benzoflex 352 (1,4-cyclohexanedimethanol dibenzoate, dicyclohexyl phthalate, Benzoflex S404 1,2,3-propane trioltribenzoate, and Benzoflex S552 1,3-propanediol, 2,2-bis[(benzoyloxy)methyl], dibenzoate, all from Velsicol Chemical Company (Chicago, Ill.). Plasticizers disclosed in U.S. Pat. Nos. 6,288,149 and 6,531,544, both are incorporated by reference in their entirety, may also be useful.

The composition can further comprise one or more additional additives, preferably selected from the group consisting of dyes, antioxidants, adhesion promoters, surfactants, colorants, UV-stabilizers, fillers, oils, rheology modifiers, cross-linking agents, and further polymers different from i). Such additives are typically included in amounts of from 0.1 to 40 wt.-%, preferably 0.2 to 30 wt.-%, more preferably 0.5 to 20 wt.-%, relative to the total weight of the composition.

The rheology of the compositions and/or the mechanical properties of the glue joint can be adjusted by the addition of so-called extender oils, i.e. aliphatic, aromatic or naphthenic oils, low molecular weight polybutenes or polyisobutylenes. Also conventional plasticizers, such as dialkyl or alkylaryl esters of phthalic acid or dialkyl esters of aliphatic dicarboxylic acids can be used, optionally in admixture with the afore-mentioned extender oils.

Suitable stabilizers that can be used in the compositions of the invention include, without limitation, 2-(hydroxyphenyl)-benzotriazole, 2-hydroxybenzophenone, alkyl-2-cyano-3-phenylcinnamate, phenylsalicylate or 1,3,5-tris(2'-hydroxyphenyl)triazine.

Suitable antioxidants include, without limitation, those commercially available under the trademark name Irganox® (BASF, SE). Also suitable are distearyl-pentaerythritdiphosphate compounds, octadecyl esters of 3,5-bis(1,1-dimethylethyl)-4-hydroxybenzylpropanoic acid (Irganox® 1076), 2,4-bis(n-octylthio)-6-(4-hydroxy-3,5-di-tert-butylanilino)-1,3,5-triazine (Irganox® 565), 2-tert-butyl-6-(3-tert-butyl-2-hydroxy-5-methylbenzyl)-4-methylphenylacrylate, phosphite antioxidants, such as tris(nonylphenyl)phosphite (TNPP), tris(mono-nonylphenyl)phosphite, and tris(di-nonylphenyl)phosphite, bis(2,4-di-tert-butylphenyl)pentaerythrit diphosphate, tris(2,4-di-tert-butylphenyl)phosphite and combinations or 2 or more of the afore-mentioned compounds.

As further polymers, styrenic block copolymers, such as styrene-isoprene-styrene, styrene-butadiene-styrene, styrene-ethylene-propylene-styrene, or combinations thereof may be used.

The hot melt adhesives according to the invention can, in various embodiments, comprise the above-mentioned compounds in the following amount, based on the total weight of the composition:

i) the at least one ethylene vinyl acetate copolymer from 10 to 80 wt.-%, preferably 20 to 70 wt.-%, more preferably 30 to 60 wt.-%;
ii) the fungicide of formula (I) from 0.001 to 1.0 wt.-%, preferably 0.01 to 0.5 wt.-%, more preferably 0.02 to 0.05 wt.-%;
iii) the tackifier from 0 to 70 wt.-%, preferably 20 to 50 wt.-%, more preferably 25 to 40, wt.-%;
iv) the wax from 0.5 to 50 wt.-%, preferably 5 to 30 wt.-%, more preferably 10 to 25 wt.-%; and
v) the further additives from 0.1 to 40 wt.-%, preferably 0.2 to 30 wt.-%, more preferably 0.5 to 20 wt.-%.

The hot melt adhesives described herein preferably have a softening point of 70 to 180° C., preferably 90 to 160° C. measured according to ASTM E 28. Further, in preferred embodiments, the adhesive compositions have a viscosity of 300 to 100,000 mPa·s at 160° C., preferably 1000 to 50,000 mPa·s at 160° C. measured according to ASTM D 3236.

The hot melt adhesives have a fungus and bacteria resistance of class 1 or class 0, preferably class 0, measured according to DIN ISO 846. They further exhibit good color stability at application temperatures of 140 to 150° C.

The adhesive compositions of the invention can be produced by conventional means. Preferred methods include the manufacture by mixers, for example planetary mixer, planetary dissolver, kneader, internal mixer and extruder.

The preferred field of application of the inventive compositions is the gluing of air filter elements, such as those used in building ventilation and air-conditioning systems, in particular those used for clean rooms. Accordingly, the present invention encompasses the use of the adhesive compositions described herein for applications that have to be compliant with the VDI 6022 standard (fungus and bacterial resistance), preferably ventilation and air conditioning systems, more preferably the air filters of such systems. Such systems may for example be used in the interior of building, including clean rooms. Such a use may include bonding, stabilizing and sealing of pleats; edge and frame bonding; or seam sealing of bag filters.

The present invention also covers method for bonding two substrates and for producing an article of manufacture by bonding two substrates. In these methods, the adhesive composition of the invention is applied in molten state onto the substrate surface, for example by a roll or by spraying, i.e. for example by nozzle, slot die, foaming, spray- or roller application. The substrate surface with the adhesive is then pressed onto the other substrate to be bonded.

The substrate may include air filter media that are used in air filter for ventilation systems. The adhesive compositions of the invention may therefore be used to bond air filter media. In these applications the fungal resistance of the adhesive is of particular importance. The thus produced bonded substrate or article, such as an air filter, is then placed in the ventilation system.

Accordingly, in various embodiments, the invention is directed to a method of manufacturing an article comprising at least two bonded substrates, comprising
 (A) applying the adhesive composition according to the invention to the surface of a first substrate to be bonded; and
 (B) bringing the surface of the first substrate to be bonded comprising the adhesive composition into contact with a second substrate to be bonded.

Depending on the number of substrates to be bonded, steps (A) and (B) may be repeated to bond a third or further substrate to the already bonded substrates.

In various embodiments, such a method is a method of manufacturing an air filter comprising the steps
a) melting the hot melt adhesive according to the invention; and
b) applying the molten hot melt adhesive of step a) to an air filter media via nozzle, slot die, foaming, spray- or roller application.

After application of the adhesive, the air filter media may be contacted with a second element of the air filter or another portion of the media to allow bonding, stabilizing and sealing of pleats; edge and frame bonding; or seam sealing of the filter.

Also encompassed by the present invention are the articles of manufacture that are obtainable according to the methods described herein and that include the adhesives described herein. In various embodiments, these articles are air filters. Such an air filter may comprise the hot melt adhesive according to the invention and a filter element.

The invention is further illustrated by the following examples. It is however understood that these examples are for purpose of illustration only and not to be construed as limiting the invention.

EXAMPLES

Example 1

Different hot melt adhesive compositions were prepared with their compositions shown in Table 1 by melting the EVA copolymer up to 160° C. and adding the other components stepwise while stirring until visual homogeneity.

TABLE 1

Adhesive compositions (all amounts are in wt.-% relative to the total weight of the composition)

| Component | Formulation V1 | V2 | E1 |
|---|---|---|---|
| EVA copolymer | 42.2 | 42.2 | 42.2 |
| Tackifier (hydrocarbon resin) | 38.0 | 38.0 | 38.0 |
| Wax | 21.6 | 21.6 | 21.6 |
| Antioxidant | 0.2 | 0.2 | 0.2 |
| Thiabendazole* | — | 0.5 | — |
| 2-Octyl-2H-isothiazolin-3-one** | — | — | 0.5 |

*Metasol TK-100SG
**Acticide CSP

The adhesive formulations were then tested with respect to their properties. The results are shown in Table 2. For this, test speciments (foils) were prepared with a heated press according to DIN ISO 846. The measurements were conducted according to DIN ISO 846.

TABLE 2

Thermal conductivities/viscosities

| | V1 | V2 | E1 |
|---|---|---|---|
| ISO 846 A Fungus | Class 2 | Class 0 | Class 0 |
| Color | Colorless/white | white | White |
| Incorporation in hot melt | OK | Not OK | OK |
| EC 1935:2004 | OK | OK | OK |
| Color stability 6 h at 140° C. | OK | OK | OK |
| ISO 846 C Bacteria | Class 1-0 | Class 0 | Class 0 |
| Comment | No migration | Migration of the fungicide to the surface of the hot melt | No migration |

The invention claimed is:

1. A hot melt adhesive comprising:
 (i) from 20 to 70 wt.-% of at least one ethylene-vinyl acetate copolymer;
 (ii) from 0.01 to 0.5 wt.-% of at least one fungicide selected from methylisothiazolinone, methylchloroisothiazolinone, benzisothiazolinone, octylisothiazolinone, dichlorooctylisothiazolinone and n-butyl-benzisothiazolinone;
 (iii) from 20 to 50 wt.-% of a hydrocarbon resin tackifier;
 (iv) from 5 to 30 wt.-% of a wax; and
 (v) from 0.2 to 30 wt.-% of an additive selected from dyes, antioxidants, adhesion promoters, surfactants, colorants, UV-stabilizers, fillers, oils, rheology modifiers, cross-linking agents, and mixtures thereof;
wherein the hot melt adhesive has (a) a softening point of 70 to 180° C. measured according to ASTM E 28; and/or (b) a viscosity of 300 to 100000 mPa·s at 160° C. according to ASTM D 3236; and
wherein the hot melt adhesive is homogeneous.

2. The hot melt adhesive according to claim 1, wherein the hot melt adhesive has a fungus and bacteria resistance of class 1 or class 0, measured according to DIN ISO 846.

3. An air filter comprising the hot melt adhesive according to claim 1 and a filter element.

4. A method of manufacturing an air filter comprising the steps
(a) melting the hot melt adhesive according to claim 1; and
(b) applying the molten hot melt adhesive of step (a) to an air filter media via nozzle, slot die, foaming or spray-or roller application.

5. The hot melt adhesive according to claim 1, wherein the fungicide is selected from benzisothiazolinone, octylisothiazolinone, dichlorooctylisothiazolinone and n-butyl-benzisothiazolinone.

6. An air filter comprising a filter element and a homogeneous hot melt adhesive consisting essentially of:
(i) an ethylene-vinyl acetate copolymer;
(ii) at least one fungicide selected from methylisothiazolinone, methylchloroisothiazolinone, benzisothiazolinone, octylisothiazolinone, dichlorooctylisothiazolinone and n-butyl-benzisothiazolinone;
(iii) a hydrocarbon resin tackifier;
(iv) a wax; and
(v) an additive selected from dyes, antioxidants, adhesion promoters, surfactants, colorants, UV-stabilizers, fillers, oils, rheology modifiers, cross-linking agents, and mixtures thereof;
wherein the hot melt adhesive (a) a softening point of 70 to 180° C. measured according to ASTM E 28; and/or (b) a viscosity of 300 to 100000 mPa·s at 160° C. according to ASTM D 3236; and
wherein the filter element is a pleat, edge-and-frame or bag seam.

7. A method of manufacturing the air filter comprising the steps
(a) melting the homogeneous hot melt adhesive according to claim 6; and
(b) applying the molten hot melt adhesive of step (a) to the filter element via nozzle, slot die, foaming or spray-or roller application.

* * * * *

UNITED STATES PATENT AND TRADEMARK OFFICE
CERTIFICATE OF CORRECTION

PATENT NO. : 11,332,646 B2
APPLICATION NO. : 16/439930
DATED : May 17, 2022
INVENTOR(S) : Bettina Becker, Andrea Hoffmann and Andre Kluth It is certified that error appears in the above-identified patent and that said Letters Patent is hereby corrected as shown below:

In the Specification

Column 5, Line 49 change "(Greenwich Conn.)" to --(Greenwich CT)--.

Column 5, Line 56 change "(Chicago, Ill.)" to --(Chicago, IL)--.

Signed and Sealed this
Thirty-first Day of January, 2023

*Katherine Kelly Vidal*

Katherine Kelly Vidal
*Director of the United States Patent and Trademark Office*